(12) United States Patent
Marsh et al.

(10) Patent No.: US 8,600,761 B2
(45) Date of Patent: Dec. 3, 2013

(54) HANDS-FREE AND NON-VISUALLY OCCLUDING OBJECT INFORMATION INTERACTION SYSTEM

(75) Inventors: Joseph C. Marsh, St. Louis, MO (US); Eric M. Smith, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 996 days.

(21) Appl. No.: 12/206,902

(22) Filed: Sep. 9, 2008

(65) Prior Publication Data

US 2010/0063821 A1    Mar. 11, 2010

(51) Int. Cl.
*G10L 21/00*    (2013.01)

(52) U.S. Cl.
USPC ........................................................ 704/275

(58) Field of Classification Search
USPC .................................. 704/270–275
See application file for complete search history.

(56) References Cited

U.S. PATENT DOCUMENTS

| | | | | |
|---|---|---|---|---|
| 5,867,688 | A * | 2/1999 | Simmon et al. | 709/208 |
| 5,924,069 | A * | 7/1999 | Kowalkowski et al. | 704/275 |
| 5,995,936 | A * | 11/1999 | Brais et al. | 704/275 |
| 6,900,777 | B1 * | 5/2005 | Hebert et al. | 345/7 |
| 6,947,866 | B2 | 9/2005 | Staab | |
| 7,084,859 | B1 * | 8/2006 | Pryor | 345/173 |
| 7,139,564 | B2 * | 11/2006 | Hebert | 455/423 |
| 2002/0178074 | A1 * | 11/2002 | Bloom | 705/26 |
| 2004/0243419 | A1 * | 12/2004 | Wang | 704/277 |
| 2005/0113136 | A1 * | 5/2005 | Gosieski, Jr. | 455/556.1 |
| 2007/0100637 | A1 * | 5/2007 | McCune | 704/277 |
| 2008/0122799 | A1 * | 5/2008 | Pryor | 345/173 |
| 2009/0213114 | A1 * | 8/2009 | Dobbins et al. | 345/419 |
| 2009/0273563 | A1 * | 11/2009 | Pryor | 345/157 |
| 2011/0161076 | A1 * | 6/2011 | Davis et al. | 704/231 |

OTHER PUBLICATIONS

Eric Foxlin and Michael Harrigton, IEEE Publication entitled, "WearTrack: A Self-Referenced Head and Hand Tracker for Wearable Computer and Portable VR," dated 2000; pp. 155-162, 8 pages.
Ahn, et al., publication entitled, "Computer Vision-Based Interactive Presentation System," 5 pages.

* cited by examiner

*Primary Examiner* — Abul Azad
(74) *Attorney, Agent, or Firm* — Hope Baldauff, LLC

(57) ABSTRACT

Technologies are described herein for providing a hands-free and non-visually occluding interaction with object information. In one method, a visual capture of a portion of an object is received through a hands-free and non-visually occluding visual capture device. An audio capture is also received from a user through a hands-free and non-visually occluding audio capture device. The audio capture may include a request for information about a portion of the object in the visual capture. The information is retrieved and is transmitted to the user for playback through a hands-free and non-visually occluding audio output device.

20 Claims, 4 Drawing Sheets

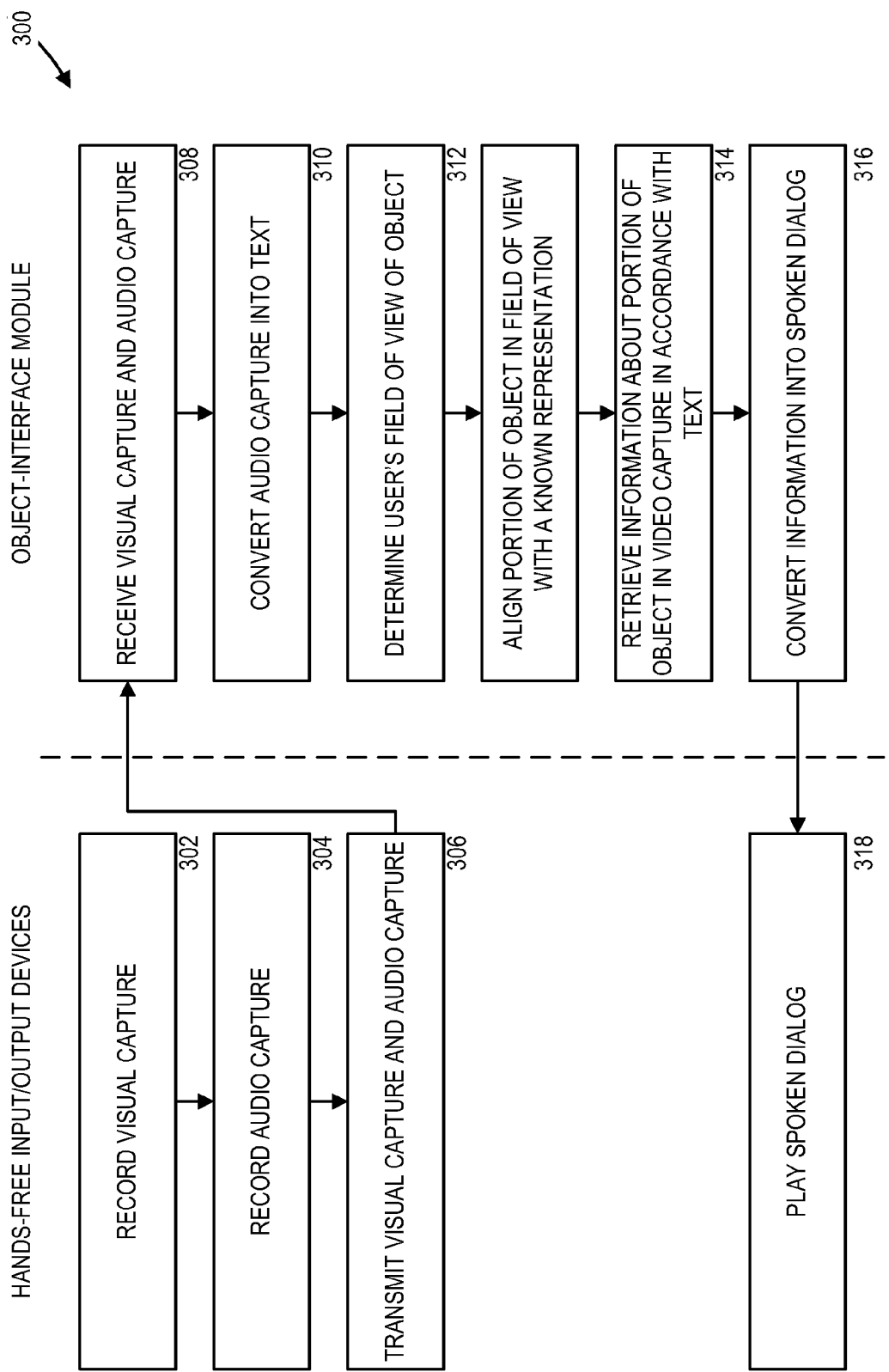

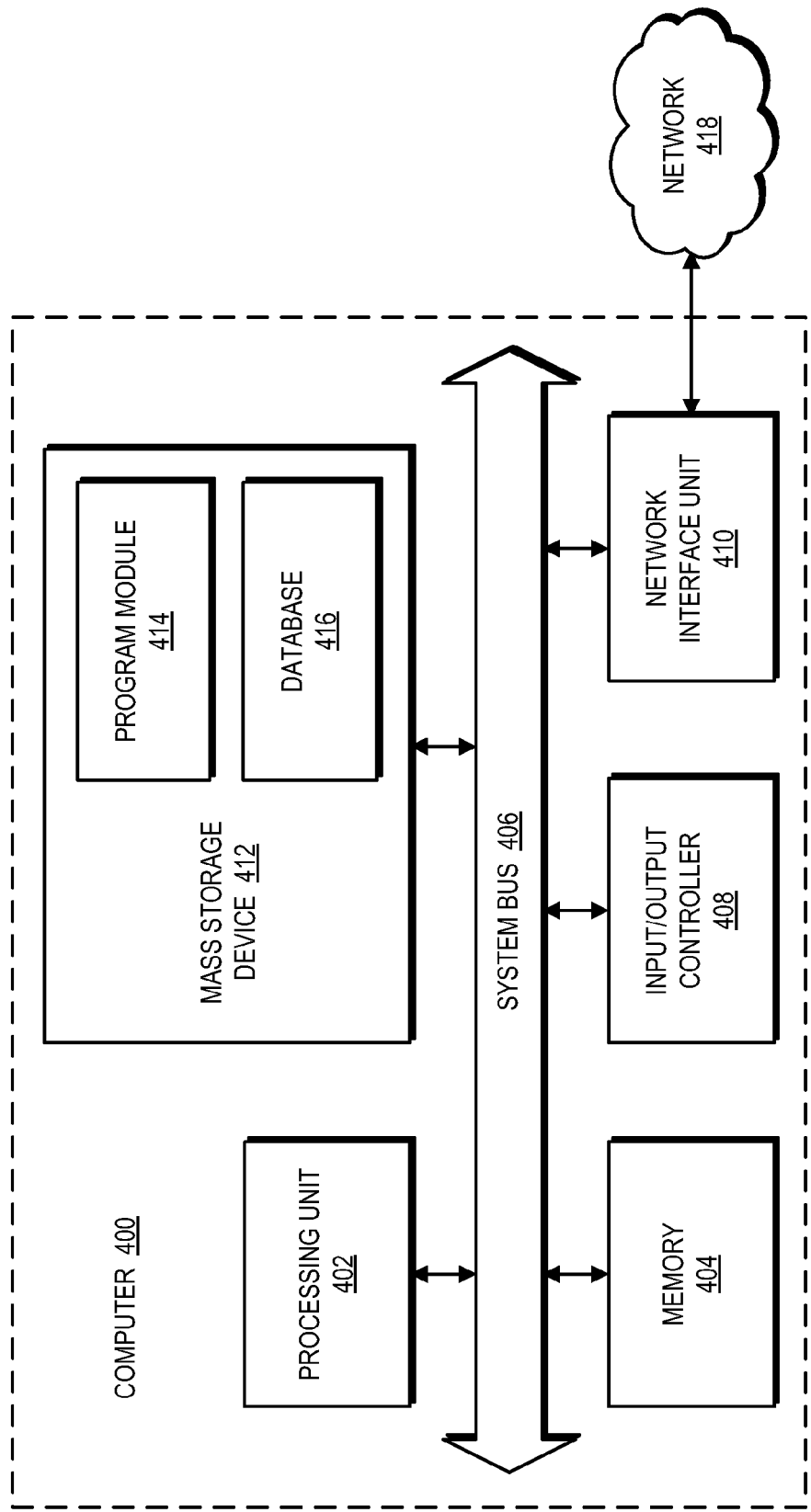

HANDS-FREE AND NON-VISUALLY OCCLUDING OBJECT INFORMATION INTERACTION SYSTEM

BACKGROUND

Due to the tremendous size of traditional aircraft, conventional wing maintenance generally involves at least two human operators. In a first example of a typical maintenance technique, a first human operator is positioned at the wing being repaired, and a second human operator is located near a computing device (e.g., a desktop or laptop computer), which is typically located away from the aircraft. The first human operator physically makes repairs to the wing (e.g., removing fasteners in a given order) based on instructions communicated from the second human operator who is operating the computing device. In particular, the computing device may be executing a maintenance application program that provides instructions for repairing the wing.

The first human operator may verbally communicate to the second human operator information about the portion of the wing being viewed. For example, the first human operator may communicate characteristics of the portion of the wing being viewed. The second human operator may input these characteristics into the maintenance application program, which outputs to a screen display instructions based on the characteristics. The second human operator may then verbally communicate to the first human operator the instructions provided by the maintenance application program. Upon receiving the instructions, the first human operator may perform maintenance on the wing based on the instructions.

This first technique enables the first human operator to fully concentrate on repairing the wing with both hands free, without the distraction of additionally operating the maintenance application program. However, the effectiveness of the first technique is substantially dependent on the accuracy and preciseness of the verbal communications between the first human operator and the second human operator. Further, verbal communications between the first human operator and the second human operator can be inefficient, particularly when the first human operator and the second human operator have difficulty communicating due to relative location, environment (e.g., noise, visual obstructions, etc.), or terminology (e.g., acronyms, slang, etc.).

In a second example of a typical maintenance technique, a video or laser projector may be positioned above a portion of the wing in order to overlay part information directly on the wing. A human operator is positioned at the wing being repaired and interacts with the projector through a suitable input device, such as a pointing device (e.g., mouse, laser tracker, etc.) or a tablet computer. Alternatively, the human operator may verbally communicate with another human operator who manually operates the projector.

While this second technique does not rely heavily on verbal communications between multiple human operators, it still has significant flaws. In particular, operating the input device requires the human operator to take at least one hand away from repairing the wing, and a larger input device, such as a tablet computer, can become cumbersome to handle when carried high above ground at the wing. By focusing on the computer generated image, the operator's attention is removed from the task at hand. The projector also can be occluded by people and objects between the projector and the wing. Further, the projector is relatively expensive compared to other conventional techniques.

It is with respect to these considerations and others that the disclosure made herein is presented.

SUMMARY

Technologies are described herein for providing a hands-free and non-visually occluding object information interface. In one implementation, the hands-free and non-visually occluding object information interface includes one or more hands-free and non-visually occluding input devices and one or more hands-free and non-visually occluding output devices. The hands-free and non-visually occluding input devices may be adapted to record an audio capture from a user and a visual capture of a portion of the object. The audio capture and the visual capture may be transmitted to a computer. The computer may be adapted to retrieve information about the portion of the object contained in the visual capture in accordance with a user request provided in the audio capture. The computer may then transmit the retrieved information to the user for playback through the hands-free and non-visually occluding output devices.

According to one aspect presented herein, various technologies are provided for providing a hands-free and non-visually occluding object information interaction. The technologies are operative to receive a visual capture of a portion of an object through a hands-free and non-visually occluding visual capture device and an audio capture from a user through a hands-free and non-visually occluding audio capture device. The audio capture may include a request for information about the portion of the object contained in the visual capture. The technologies are operative to retrieve the information and transmit the information to the user for playback through a hands-free and non-visually occluding audio output device.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a flow diagram showing a method for providing hands-free and non-visually occluding object information interaction, in accordance with one embodiment; and FIG. 4 is a computer architecture diagram showing aspects of an illustrative computer hardware architecture for a computing system capable of implementing aspects of the embodiments presented herein.

DETAILED DESCRIPTION

The following detailed description is directed to technologies for providing a hands-free and non-visually occluding object interaction system. In particular, the hands-free and non-visually occluding object interaction system enables a human operator to provide a visual capture of a three-dimensional object and to receive relevant information about a portion of the object in the visual capture entirely in a hands-free and non-visually occluding manner. As used herein, the term "hands-free" refers to the ability of a user to operate a given device without using her hands. For example, a hands-free video camera may be mounted to the user's head such that the video camera can record video without the user holding the video camera. Further, the hands-free video camera may accept voice commands to replace conventional functions (e.g., record, play, etc.) in which the user would typically activate through buttons on the video camera or a remote control. As used herein, the term "non-visually occluding" refers to the ability of a user to operate a given device without any visual artifacts within the user's field of view. For example, a non-visually occluding speaker and microphone may be mounted to the user's head such that the microphone records verbal commands and the speaker provides part information without the user looking at a projection or computer screen.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
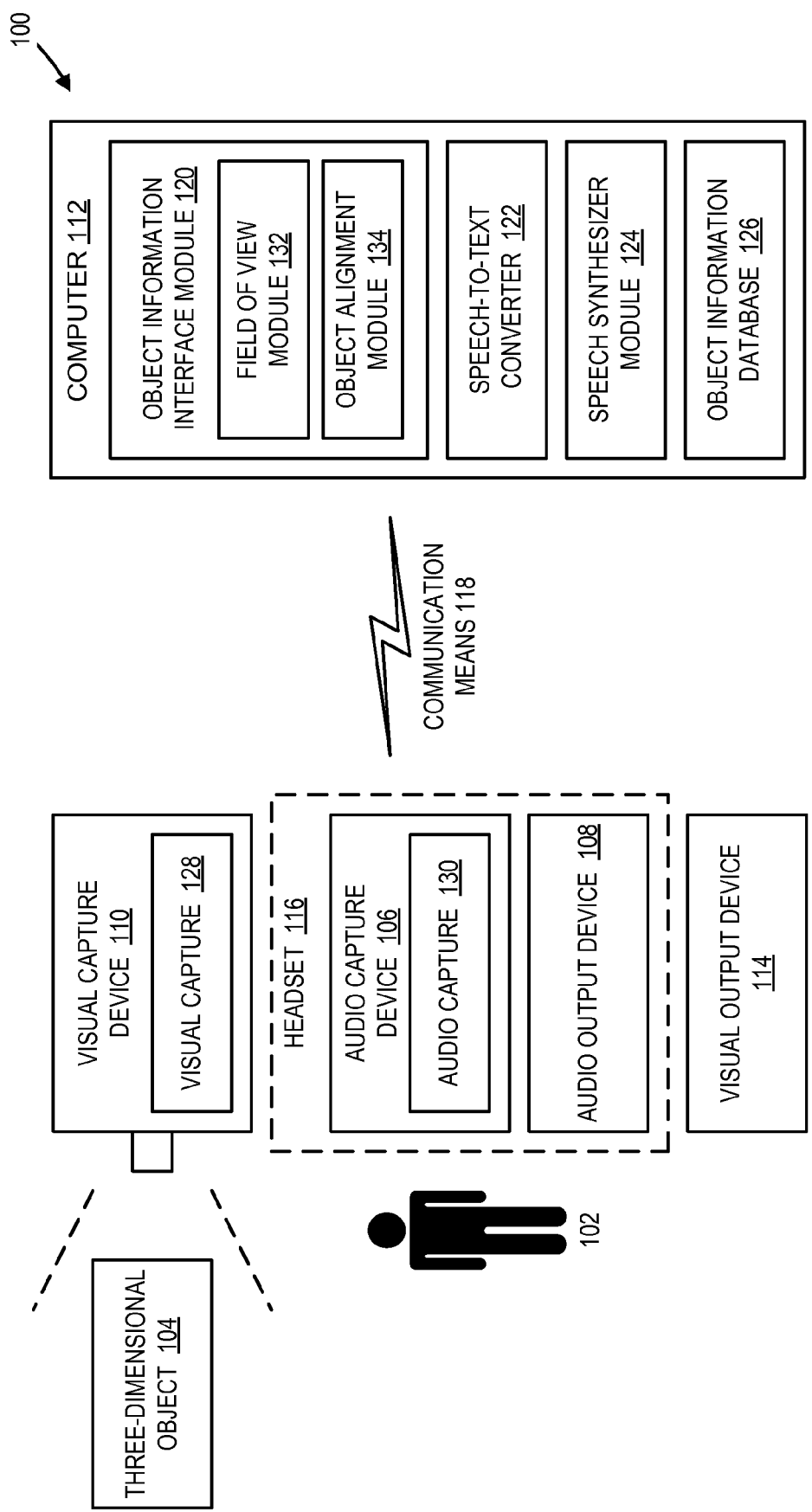
FIG. 1 is a network architecture diagram operative to provide hands-free and non-visually occluding object interaction, in accordance with one embodiment.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing a hands-free and non-visually occluding object information interaction system will be described. FIG. 1 shows an illustrative network architecture 100 operative to implement an embodiment of a hands-free and non-visually occluding object information interaction system. The architecture 100 includes a user 102 who is interacting with a three-dimensional object (hereinafter referred to as "object") 104. For example, the user 102 may be an aircraft maintenance technician who is removing fasteners or performing other maintenance tasks on a wing of an aircraft. It should be appreciated that the wing maintenance example described throughout this disclosure is merely illustrative and is not limiting. In particular, the user 102 may utilize the hands-free and non-visually occluding object information interaction system described herein to interact with any suitable three-dimensional object.

According to embodiments, physically attached to the user 102 are at least an audio capture device 106, an audio output device 108, and a visual capture device 110. The audio capture device 106 may be any suitable device that records dialog spoken by the user 102. This spoken dialog recorded by the audio capture device 106 is referred to herein as an audio capture 130. The visual capture device 110 may be any suitable device that visually records a portion of the object 104 as viewed by the user 102. In particular, the visual capture device 110 may be a still camera, a video camera, or other suitable visual capture device. The video and/or images recorded by the visual capture device 110 is referred to herein as a visual capture 128. The visual capture 128 and the audio capture 130 may be transmitted to a computer 112 via a wireless communication means 118 or other suitable network for processing, as described in greater detail below.

The audio output device 108 may be any suitable device that outputs to the user 102 dialog received from another entity, such as the computer 112. In one embodiment, a visual output device 114 may also be physically attached to the user 102. It should be appreciated that the visual output device 114 may be included to supplement the information provided by the audio output device 108. However, since the visual output device 114 may introduce at least some visual occlusion to the user 102, the visual output device 114 may be removed according to further embodiments. That is, the visual output device 114 may be removed without affecting other capabilities of the system. The visual output device 114 may be any suitable device that outputs to the user 102 images and/or video received from another entity, such as the computer 112, via the wireless communication means 118 or other suitable network. The audio capture device 106, the audio output device 108, the visual capture device 110, and the visual output device 114 may be collectively referred to herein as hands-free input/output devices.

In one embodiment, the audio capture device 106 and the audio output device 108 are combined into a single device, such as a headset 116, that wraps around the head of the user 102. In the headset 116, the audio capture device 106 may be a microphone positioned at or near the mouth of the user 102, and the audio output device 108 may be earphones positioned at or near at least one ear of the user 102. Since the headset 116 is attached to the user 102, the user 102 can operate the audio capture device 106 and the audio output device 108 in a hands-free manner. This makes available the hands and eyes of the user 102 for other tasks, such as performing maintenance tasks (e.g., repair, upgrades, diagnostics, etc.) on the object 104. Other suitable devices that attach to the user 102 and combine the audio capture device 106 and the audio output device 108 may be similarly utilized.

The visual capture device 110 may be attached to the user via a head mount or a helmet mount, according to one embodiment. In particular, the visual capture device 110 may be mounted and configured to visually record a portion of the object 104 in the same way that the user 102 views the object 104. By configuring the visual capture device 110 in this manner, the visual capture device 110 can provide the computer 112 an accurate portrayal of the object 104 as viewed by the user 102. In one embodiment, the visual capture device 110 is controlled through voice commands spoken by the user 102 into the audio capture device 106. The visual output device 114 may include any suitable head-up display that is capable of projecting images and/or video to a small display element positioned near an eye of the user 102.

As illustrated in FIG. 1, the computer 112 includes an object information interface module 120, a speech-to-text converter 122, a speech synthesizer module 124, and an object information database 126. The object information interface module 120 is configured to receive an audio capture 130 recorded by the audio capture device 106 and a visual capture 128 recorded by the visual capture device 110 via the wireless communication means 118 or other suitable network. The object information interface module 120 may utilize the speech-to-text converter 122 to convert the audio capture 130 into text that is recognized by the object information interface module 120. Other modules may be similarly utilized to convert the audio capture 130 into other suitable formats that is recognizable by the object information interface module 120.

According to embodiments, the object information interface module 120 includes a field of view module 132 and an object alignment module 134. The field of view module 132 is operative to determine the field of view of the visual capture device 110. As used herein, the term "field of view" or simply "view" refers to the position (e.g., orientation, angle, distance, location, etc.) of the visual capture device 110 with respect to the object 104. The position of the visual capture device 110 can determine the portion of the object 104 that is recorded by the visual capture device 110 and contained in the visual capture 128. The field of view may be represented by coordinates (e.g., X, Y, and Z) on a three-dimensional ("3D") coordinate system or other suitable representation. The field of view may be determined using pose estimation, real-time camera tracking, and other suitable techniques as contemplated by those skilled in the art.

Figure 2C:
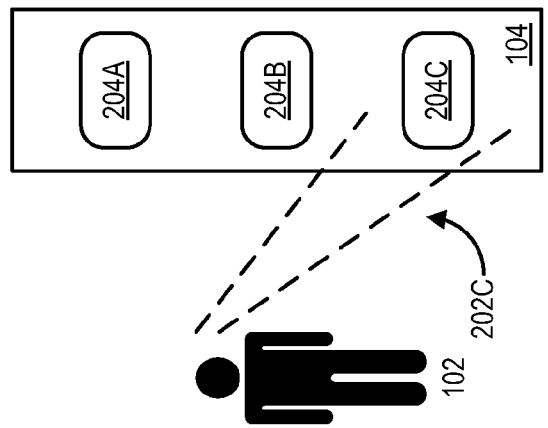
FIGS. 2A-2C are diagrams showing various field of views of a visual capture device with respect to an object, in accordance with embodiments.
Figure 2B:
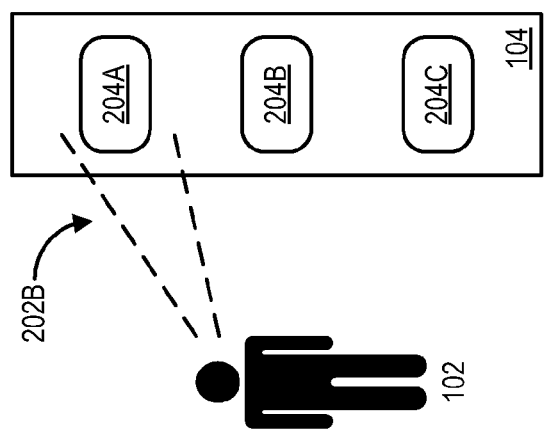
Figure 2A:
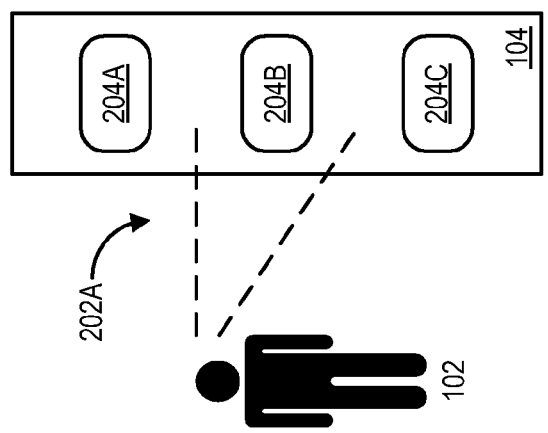

Referring now to FIGS. 2A-2C, additional details regarding the field of view of the visual capture device 110 will be described. In particular, FIG. 2A shows a first view 202A of the object 104, and FIG. 2B shows a second view 202B of the object 104. Further, FIG. 2C shows a third view 202C of the object 104. The first view 202A, the second view 202B, and the third view 202C may be collectively referred to as views 202. For purposes of illustration, the views 202 are shown as dotted lines in FIGS. 2A-2C. However the views 202 may be represented as 3D coordinates or other suitable representations by the field of view module 132. As illustrated in FIGS. 2A-2C, the object 104 is a portion of an aircraft wing that includes a first fastener 204A, a second fastener 204B, and a third fastener 204C (collectively referred to as fasteners 204).

In FIG. 2A, the first view 202A of the user 102 is centered on the second fastener 204B. In this case, the visual capture 128 includes the second fastener 204B. In FIG. 2B, the second view 202B of the user 102 is centered on the first fastener 204A. For example, the user 102 may have positioned the visual capture device 110 upwards (e.g., tilted her head upwards on a head-mounted camera) to focus on the first fastener 204A. In this case, the visual capture 128 includes the first fastener 204A. In FIG. 2C, the third view 202C of the user 102 is centered on the third fastener 204C. For example, the user 102 may have positioned the visual capture device 110 downwards (e.g., tilted her head downwards on a head-mounted camera) to focus on the third fastener 204C. In this case, the visual capture 128 includes the third fastener 204C. As illustrated in FIGS. 2A-2C, the position of the visual capture device 110 can be changed in order to record different portions of the object 104 into the visual capture 128.

Referring again to FIG. 1, the object alignment module 134 is operative to align the user's view, such as one of the views 202, of the object 104 contained in the visual capture 128 with a known representation of the object 104. For example, if the user 102 is viewing an aircraft wing, the object alignment module 134 may determine which portion of the aircraft wing is being viewed based on the visual capture 128 and the known representation of the object 104. In this way, the portion of the object 104 being viewed by the user 102 at any given instance can be determined and relevant information can be provided to the user 102.

The object alignment module 134 may utilize computer aided design ("CAD") representations of the object 104, simultaneous location and mapping ("SLAM") based techniques, and other suitable methodologies in order to determine the portion of the object 104 contained in the visual capture 128. In one embodiment, the visual capture 128 may be compared with the CAD representations of the object 104 in order to determine the portion of the object 104 in the visual capture 128. The CAD representations may include multiple views of the object 104 across all three dimensions, thereby enabling the object information interface module 120 to determine the portion of the object 104 regardless of the angle or position at which the user 102 is viewing the object 104.

In another embodiment, the portion of the object 104 contained in the visual capture 128 may be mapped using SLAM in combination with a suitable object recognition technique. In one example, SLAM may be used to produce a point cloud, which can then be matched to a known representation (e.g., a CAD model). In another example, SLAM may be used to generate SLAM maps, which can be scaled and aligned using visual features recognized by a suitable non-SLAM feature recognizer. In yet another example, an initial SLAM map may be manually aligned to a known representation.

It should be appreciated that the embodiments described herein may be implemented with or without object recognition techniques. If object recognition techniques are not used, then the user 102 may manually input information about the object 104 being viewed. Alternatively, object recognition techniques may be used in order to determine the object 104 without manual input from the user 102.

In one embodiment, the audio capture 130 provided to the object information interface module 120 includes commands from the user 102 requesting information regarding the portion of the object 104 in the visual capture 128. In one example, the user 102 may request information identifying the portion of the object 104 being viewed by the user 102. In another example, the user 102 may request instructions for performing a particular maintenance task on the portion of the object 104.

The object information interface module 120 may access a local or remote database, such as the object information database 126, to retrieve the requested information. The object information interface module 120 may then utilize the speech synthesizer module 124 to convert the information retrieved from the object information database 126 into a spoken dialog that can be transmitted via the wireless communication means 118 or other suitable network to the user 102 and played to the user 102 through the audio output device 108. Further, any images and/or video provided to the user 102 by the object information database 126 may also be shown to the user 102 through the visual output device 114.

In an illustrative implementation of the headset 116 and the visual capture device 110, the user 102 may be responsible for performing maintenance tasks on the object 104. For example, the object 104 may be a wing of an aircraft, and the user 102 may be a maintenance technician assigned to remove fasteners on the wing in a certain order as determined by the computer 112. The visual capture device 110 may be a head-mounted video camera attached to the user 102. The user 102 may provide voice commands into the audio capture device 106 in the headset 116 in order to control the head-mounted camera for performing basic video camera functions, such as record, zoom, and stop. Alternatively, the head-mounted video camera may record video in a predefined configuration, such as a configuration that mimics the view from the user 102. In one embodiment, the head-mounted video camera may also include a laser guide or other visual pointing mechanism to inform the user 102 of the position of the camera. The laser guide can be configured to provide a visual indicator at the center of the field of view of the camera.

Upon recording the video, the user 102 may instruct the visual capture device 110 to transmit the recorded video to the computer 112. Alternatively, the transmission may be continuous or dependent upon other suitable triggers from the user 102. The user 102 may also utilize the audio capture device 106 to submit requests for information about the portion of the object 104 contained in the recorded video. Upon receiving the requests, the object information interface module 120 may retrieve the information from the object information database 126 or other suitable data storage device based on the requests. For example, a predefined query associated with a request from the user 102 may be submitted to the object information database 126, and the object information database 126 may return information associated with the query. The object information interface module 120 may then convert the information into a spoken dialog using the speech synthesizer module 124 and transmit the spoken dialog to the user 102 for playback through the audio output device 108.

It should be appreciated that the configuration of the network architecture 100 of the hands-free and non-visually occluding object information interaction system illustrated in FIG. 1 is merely illustrative. In particular, other configurations of the components of the network architecture 100 may be contemplated by those skilled in the art. For example, the speech-to-text converter 122 and/or the speech synthesizer module 124 may be embedded in the headset 116. Further, even the computer 112 may be combined with the visual capture device 110, the visual output device 114, and/or the headset 116 to form a single device such that communications via the wireless communication means 118 or other suitable network becomes unnecessary.

Turning now to FIG. 3, additional details will be provided regarding the operation of the object information interface module 120. In particular, FIG. 3 is a flow diagram illustrating aspects of one method provided herein for providing a hands-free and non-visually occluding object information interface. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring now to FIG. 3, a routine 300 begins at operation 302, where the visual capture device 110 records a visual capture 128 of a portion of the object 104. As previously discussed, the visual capture device 110 may be a video camera for capturing video or a still camera for capturing images. The visual capture device 110 may be attached to the user and configured to accept voice commands in order to facilitate hands-free operation by the user 102. Upon recording the visual capture 128, the routine 300 proceeds to operation 304.

At operation 304, the audio capture device 106 records an audio capture 130 from the user 102. The audio capture 130 may include a request for information about a portion of the object 104 contained in the visual capture 128. It should be appreciated that the audio capture 130 and the visual capture 128 may be recorded simultaneously or concurrently, or the audio capture 130 and the visual capture 128 may be recorded in any order. In one embodiment, the request for information includes a request for information identifying a portion of the object 104 contained in the visual capture 128. For example, the user 102 may request information identifying a part of a wing that the user 102 is viewing. In another embodiment, the request for information may include a request for instructions for performing a maintenance task on a portion of the object 104 contained in the visual capture 128. For example, the maintenance task may include repairing, upgrading, and performing diagnostics on a portion of the object 104. The audio capture device 106 may also be used to record voice commands for controlling the visual capture device 110 and other suitable hands-free input/output devices. Upon recording the audio capture 130 from the user 102, the routine 300 proceeds to operation 306.

At operation 306, the visual capture device 110 and the audio capture device 106 transmit the visual capture 128 and the audio capture 130, respectively, to the object information interface module 120 via the wireless communication means 118 or other suitable communications network. Thus, at operation 308, the object information interface module 120 receives the visual capture 128 and the audio capture 130. Upon receiving the visual capture 128 and the audio capture 130, the routine 300 proceeds to operation 310.

At operation 310, the object information interface module 120 utilizes the speech-to-text converter 122 to convert the audio capture 130 into text or other suitable format that is recognized by the object information interface module 120. For example, the object information interface module 120 may be configured to perform pre-defined actions in accordance with certain text commands. In this case, converting the audio capture 130 into text enables the object information interface module 120 to determine which actions to perform according to the audio capture 130. Alternatively, the object information interface module 120 may be configured to interpret the audio capture 130 without utilizing the speech-to-text converter 122. Upon converting the audio capture 130 into text, the routine 300 proceeds to operation 312.

At operation 312, the object information interface module 120 determines the field of view, and, in one embodiment, the center of the field of view, of the object 104. As previously described, the field of view of the object 104 can determine the portion of the object 104 recorded in the visual capture 128. The object information interface module 120 may utilize pose estimation, real-time camera tracking, and other suitable techniques in order to determine the field of view. By calculating the position of the visual capture device, the portion of the object 104 being viewed can be determined. Upon determining the field of view, the routine 300 proceeds to operation 313.

At operation 313, the object information interface module 120 may determine the portion of the object 104 that was recorded in the visual capture 128. In one embodiment, the object information interface module 120 aligns the visual capture 128 with CAD representations of the object 104. In this case, the user 102 may inform the object information interface module 120 of the model number or some other limiting identifier of the object 104. Thus, the object information interface module 120 can reduce the number of CAD representations with which to compare with the visual capture 128. In another embodiment, the object information interface module 120 maps the object 104 using a suitable SLAM based technique. In particular, SLAM enables the object information interface module 120 to map an otherwise unknown object 104 while also calculating the location and orientation of the visual capture device 110. Upon determining the portion of the object 104 contained in the visual capture 128, the routine 300 proceeds to operation 314.

At operation 314, the object information interface module 120 retrieves information about the portion of the object 104 in the visual capture 128. In particular, the information retrieved by the object information interface module 120 is the information requested by the user 102 in the audio capture 130. In one embodiment, the information retrieved may be information identifying a portion of the object 104. For example, the information may identify a part on a wing by name and model number. In another embodiment, the information retrieved may be instructions for performing a service task on a portion of the object 104. For example, the information may include instructions for removing fasteners on a wing. The object information interface module 120 may retrieve the information from the object information database 126 or other suitable data storage device. Upon retrieving information about the portion of the object 104 in the visual capture 128, the routine 300 proceeds to operation 316.

At operation 316, the object information interface module 120 utilizes the speech synthesizer module 124 to convert the retrieved information into a spoken dialog. The object information interface module 120 may then transmit the spoken dialog to the user 102. The routine 300 then proceeds to operation 318, where the audio capture device 106 plays the spoken dialog to the user 102. In another embodiment, the object information interface module 120 may transmit visual output (e.g., text, images, video, etc) to the user 102 in addition to the spoken dialog. The visual output may be provided to the user 102 through the visual output device 114. By transmitting the information to the user 102 in an audible (and, in one embodiment, visual) format, the object information interface module 120 facilitates hands-free operation.

Referring now to FIG. 4, an exemplary computer architecture diagram showing aspects of a computer 400 is illustrated. An example of the computer 400 is the computer 112. The computer 400 includes a processing unit 402 ("CPU"), a system memory 404, and a system bus 406 that couples the memory 404 to the CPU 402. The computer 400 further includes a mass storage device 412 for storing one or more program modules 414 and one or more databases 416. Examples of the program modules 414 may include the object information interface module 120, the speech-to-text converter 122, and the speech synthesizer module 124. An example of the databases 416 may include the object information database 126. The mass storage device 412 is connected to the CPU 402 through a mass storage controller (not shown) connected to the bus 406. The mass storage device 412 and its associated computer-readable media provide nonvolatile storage for the computer 400. Although the description of computer-readable media contained herein refers to a mass storage device, such as a hard disk or CD-ROM drive, it should be appreciated by those skilled in the art that computer-readable media can be any available computer storage media that can be accessed by the computer 400.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network 418. An example of the network 418 is the wireless communication means 118. The computer 400 may connect to the network 418 through a network interface unit 410 connected to the bus 406. It should be appreciated that the network interface unit 410 may also be utilized to connect to other types of networks and remote computer systems. The computer 400 may also include an input/output controller 408 for receiving and processing input from a number of input devices (not shown), including a keyboard, a mouse, a microphone, and a game controller. Similarly, the input/output controller 408 may provide output to a display or other type of output device (not shown) connected directly to the computer 112 or to the user 102, such as the visual output device 114.

Based on the foregoing, it should be appreciated that technologies for providing a hands-free and non-visually occluding object information interface are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing a hands-free and non-visually occluding object information interface, comprising:
    receiving a direct visual capture of a portion of an object through a hands-free and non-visually occluding visual capture device configured for attachment to a user at the same location as the object;
    receiving an audio capture from the user through a hands-free and non-visually occluding audio capture device, the audio capture comprising a request for information about a portion of the object in the visual capture;
    retrieving the information; and
    transmitting the information to the user for playback through a hands-free and non-visually occluding output device.

2. The method of claim 1, wherein receiving a visual capture of a portion of an object through a hands-free and non-visually occluding visual capture device comprises receiving a video capture of a portion of the object through a video capture device.

3. The method of claim 1, wherein receiving a visual capture of a portion of an object through a hands-free visual capture device comprises receiving an image capture of a portion of the object through a hands-free image capture device.

4. The method of claim 1, wherein the hands-free and non-visually occluding visual capture device is operated through voice commands spoken into the hands-free and non-visually occluding audio capture device.

5. The method of claim 1, wherein the hands-free and non-visually occluding visual capture device mimics an actual view from the user operating the hands-free and non-visually occluding visual capture device.

6. The method of claim 1, wherein retrieving the information comprises:
    converting the audio capture into text comprising the request for information; and
    retrieving the information about a portion of the object according to the request for information in the text.

7. The method of claim 1, wherein transmitting the information to the user for playback through a hands-free and non-visually occluding output device comprises:
   converting the information to a spoken dialog through a speech synthesizer; and
   transmitting the spoken dialog to the user for playback through the hands-free and non-visually occluding audio output device.

8. The method of claim 1, further comprising determining a field of view of the visual capture device with respect to the object.

9. The method of claim 8, further comprising aligning the field of view with a known representation of the object to determine the field of view of the visual capture device with respect to the object.

10. The method of claim 9, wherein the known representation of the object comprises a computer aided design (CAD) generated representation of the object.

11. The method of claim 8, further comprising mapping the portion of the object in the visual capture utilizing a simultaneous location and mapping (SLAM) analysis of the visual capture.

12. The method of claim 1, wherein retrieving the information comprises retrieving information identifying the portion of the object.

13. The method of claim 1, wherein retrieving the information comprises retrieving instructions for performing a maintenance task on the portion of the object.

14. A method for providing a hands-free and non-visually occluding object interface, comprising:
   receiving a video capture of a portion of an object through a hands-free and non-visually occluding video capture device attached to a user operating the hands-free and non-visually occluding video capture device at the same location as the object, the hands-free and non-visually occluding video capture device configured to directly capture video of the portion of the object as actually viewed by the user;
   receiving an audio capture from the user through a hands-free and non-visually occluding audio capture device attached to the user, the audio capture comprising a request for information about the portion of the object in the video capture;
   converting the audio capture into text comprising the request for information;
   retrieving the information according to the request for information in the text;
   converting the information into a spoken dialog through a speech synthesizer; and
   transmitting the information to the user for playback through a hands-free and non-visually occluding audio output device attached to the user.

15. The method of claim 14, wherein the hands-free and non-visually occluding video capture device comprises a head-mounted video camera or a helmet-mounted video camera.

16. The method of claim 14, wherein the hands-free and non-visually occluding audio capture device and the hands-free and non-visually occluding audio output device comprise a headset attached to the user.

17. The method of claim 14, wherein the request for information about the portion of the object in the video capture comprises predefined commands for processing the video capture.

18. The method of claim 14, wherein the hands-free and non-visually occluding video capture device is controlled by instructions spoken into the hands-free audio capture device.

19. A non-transitory computer-readable medium having computer-executable instructions stored thereon which, when executed by a computer, cause the computer to:
   receive a video capture of a portion of an object through a hands-free and non-visually occluding video capture device attached to a user operating the hands-free and non-visually occluding video capture device at the same location as the object, the hands-free and non-visually occluding video capture device being configured to directly capture video of the portion of the object as actually viewed by the user;
   receive an audio capture from the user through a hands-free and non-visually occluding audio capture device attached to the user, the audio capture comprising a request for instructions for performing a maintenance task on the portion of the object in the video capture;
   convert the audio capture into text comprising the request for instructions;
   retrieve the instructions according to the request for instructions in the text;
   convert the instructions into a spoken dialog through a speech synthesizer; and
   transmit the instructions to the user for playback through the a hands-free and non-visually occluding audio output device attached to the user.

20. The non-transitory computer-readable storage medium of claim 19, wherein the object comprises an aircraft component or assembly.

* * * * *